No. 781,341. Patented January 31, 1905.

UNITED STATES PATENT OFFICE.

GEORGE E. HIPP, OF BUFFALO, NEW YORK.

PROCESS OF MAKING THE DOUBLE SULFATE OF ALUMINUM AND SODIUM.

SPECIFICATION forming part of Letters Patent No. 781,341, dated January 31, 1905.

Application filed December 15, 1902. Serial No. 135,353.

*To all whom it may concern:*

Be it known that I, GEORGE E. HIPP, a citizen of the United States, residing at Buffalo, in the county of Erie and State of New York, have invented a new and useful Process of Making the Double Sulfate of Aluminum and Sodium; and I do hereby declare that the following is a full, clear, and exact description of the invention, which will enable others skilled in the art to which it appertains to make and use the same.

This invention relates to a process of manufacturing double sulfate of aluminum and sodium by compounding niter-cake, (sodium bisulfate,) sulfid of an alkali metal, bauxite clay, or other aluminous product, sulfate-of-aluminum liquid, free acid, and calcining and otherwise treating the ingredients, as will be fully described hereinafter.

The objects of this invention are to render the manufacturing of double sulfate of aluminum and sodium more economical, much cheaper, and more expeditious than has heretofore been possible, to extract all arsenic and lead, which are considered injurious, and provide a substitute which is much cheaper than cream of tartar and has all the necessary qualities of the same, and also to provide a double sulfate of aluminum and sodium, of which a given quantity will neutralize a corresponding quantity of bicarbonate of soda.

In carrying out my process I take one hundred pounds of niter-cake, (sodium bisulfate,) which contains thirty-three and one-third per cent. sulfuric acid, and thereto I add water to dissolve the cake. When solution is completed, a quantity of sulfid of an alkali metal is added, about one and one-half to two pounds, which liberates the hydrogen sulfid formed by the action thereon of the acid in the niter-cake. This hydrogen sulfid while being liberated precipitates the arsenic and selenium as insoluble compounds, after which the solution is clarified to eliminate the insoluble matter, consisting of arsenic and selenium sulfids, lead sulfate, and insoluble matter of the niter-cake. To this solution I add a sufficient quantity of an aluminous product to combine with the free acid, after which the solution is clarified to eliminate any insoluble silica, &c. After this action has taken place a sufficient quantity of solution of sulfate of aluminum is added to produce the double sulfate,

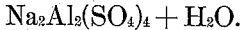
$$Na_2Al_2(SO_4)_4 + H_2O.$$

Then about one-half of one per cent. of free acid is added to the solution. The whole is then concentrated and allowed to cool, after which it is calcined to eliminate the water and produce the anhydrous sulfate,

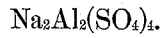
$$Na_2Al_2(SO_4)_4.$$

Having thus described my invention, what I claim is—

1. The process of manufacturing double sulfate of aluminum and sodium, consisting in first dissolving niter-cake and adding thereto a quantity of sulfid of an alkali metal, then clarifying the solution and adding an aluminous product, after which the solution is again clarified, then adding a quantity of solution of sulfate of aluminum, and next adding free acid, after which the whole is concentrated and calcined, substantially as set forth.

2. The process of manufacturing double sulfate of aluminum and sodium, consisting in first dissolving niter-cake and adding thereto about one and one-half to two per cent. of a sulfid of an alkali metal, then clarifying the solution to eliminate the insoluble matter, and adding an aluminous product after which the solution is again clarified, then adding a sufficient quantity of solution of sulfate of aluminum to produce the double sulfate, and next adding about one-half of one per cent. free acid, after which the whole is concentrated and calcined, substantially as set forth.

In testimony whereof I have hereunto set my hand in the presence of two subscribing witnesses.

GEORGE E. HIPP.

Witnesses:
  CHAS. F. BURKHART,
  EMIL NEUHART.